Feb. 13, 1951     G. R. ANDERSON     2,541,906
SEAL FOR ELECTRIC MOTORS
Filed Sept. 25, 1948
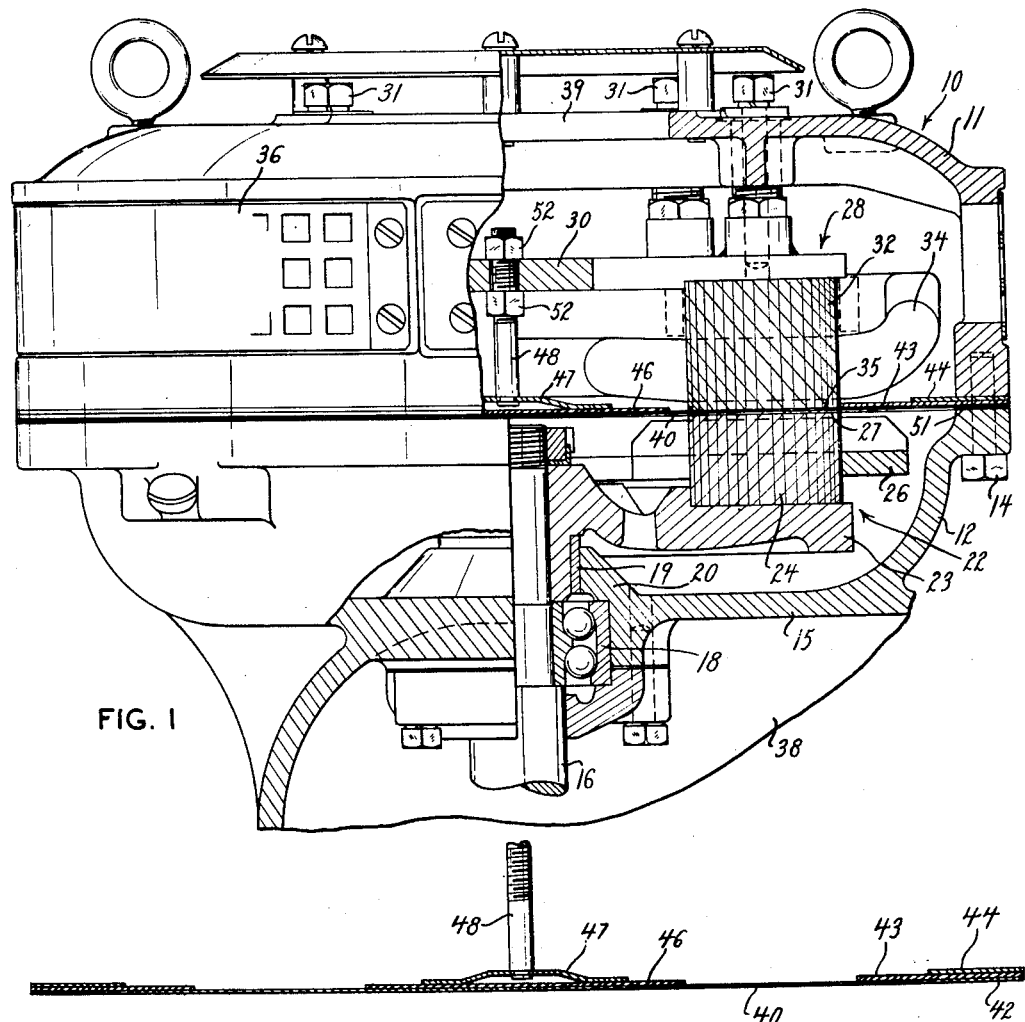
FIG. 1
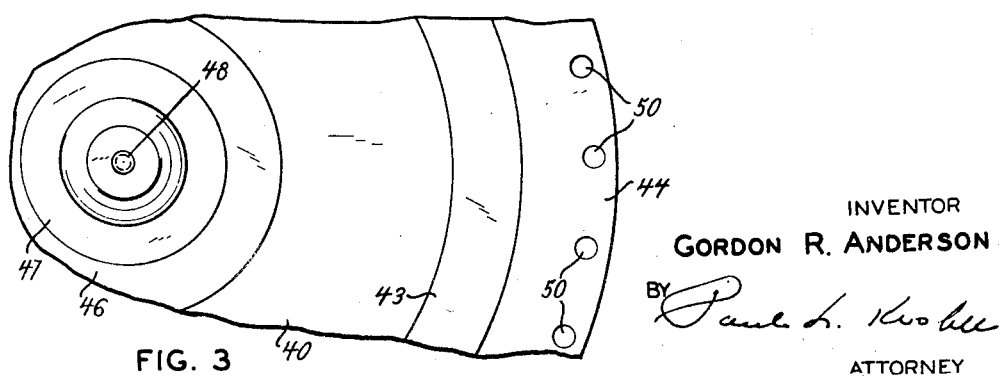
FIG. 2
FIG. 3
INVENTOR
GORDON R. ANDERSON
BY
ATTORNEY Patented Feb. 13, 1951

2,541,906

UNITED STATES PATENT OFFICE 2,541,906

SEAL FOR ELECTRIC MOTORS

Gordon R. Anderson, Beloit, Wis., assignor to Fairbanks, Morse & Co., Chicago, Ill., a corporation of Illinois Application September 25, 1948, Serial No. 51,249

6 Claims. (Cl. 172—36)

1

This invention relates to improvements in electric motors for use with fluid pumps, refrigeration compressors and the like, having sealed casings.

In electric motor drive of refrigerant compressors for example, wherein the drive shaft extends through a wall of the compressor casing, great difficulty has been experienced in the past, in effectively sealing the casing at the zone of shaft extension therethrough, to prevent fluid leakage outwardly of the casing. Moreover, in those instances where the motor and compressor are close-coupled and fluid leakage from the compressor casing past the drive shaft has access to or may accumulate in the motor casing, it has been found in some cases that the leakage fluid has produced deleterious effects upon the motor windings and other motor parts. Accordingly, it is the principal purpose of the present invention to provide particularly in respect to a close-coupled drive motor and compressor assembly, a sealing arrangement in the motor assembly which is fully effective to prevent fluid leakage loss as well as contact of leakage fluid with the motor stator windings, the sealing provision further being of a character to render unnecessary any more than a simple running seal of the shaft in its extension through a wall of the compressor casing.

Another object of the present invention is to utilize as the drive unit for a sealed casing refrigeration compressor or the like, an electric motor of axial air gap type wherein the rotor element of the motor and the drive shaft including its bearing in a wall of the compressor, are sealed off from the motor stator assembly by a novel and highly effective sealing wall of diaphragm character, disposed to extend through the motor air gap.

Other objects and advantages of the present invention will appear from the following description of a presently preferred embodiment thereof, as such is exemplified in the accompanying drawing, wherein:

Fig. 1 is a view partly in longitudinal section through the motor assembly and a fragmentary part of the compressor casing, illustrating the sealing provision afforded by the present invention;

Fig. 2 is a sectional elevation transversely through the sealing wall element of the present invention, and Fig. 3 is a fragmentary view in plan, of the sealing wall.

Referring to the drawing by appropriate characters of reference, there is illustrated in Fig. 1 an electric motor of axial air gap type enclosed by a housing structure 10 comprising a removable housing section 11 and housing section 12, the sections being connected in assembly by bolts 14. Section 12 of the motor housing preferably is formed by an extension from a wall 15 of the pump or compressor casing with which the drive motor is associated. In the present example, the compressor rotor shaft 16 is extended through wall 15 and terminates within the motor housing section 12, the shaft being suitably journalled in its extension through wall 15 as by a ball bearing assembly 18, and is provided with a simple running seal comprising a sealing sleeve element 19 between the shaft and a wall projection 20. Suitably secured on the shaft is the motor rotor 22 comprising a frame support 23 mounting an annular magnetic core 24. Associated with the core 24 is a squirrel-cage winding 26, since in the present example the motor by preference is of the induction type, of either single or polyphase form. The rotor thus presents a plurality of pole faces (one indicated at 27 in Fig. 1) disposed in a common plane perpendicular to the longitudinal axis of shaft 16.

Within the motor housing section 11 is the stator assembly 28 comprising a frame support member 30 suitably mounted in the housing section, as by bolts 31, the frame 30 in turn carrying a magnetic stator core 32 of annular extent, having stator windings 34 seated through slots in the core. Stator core 32 presents a plurality of stator pole faces (one indicated at 35 in Fig. 1) lying in a plane perpendicular to the motor axis and hence parallel to the plane of the rotor pole faces. In motor assembly, the rotor and stator assemblies are so related as to afford an air gap between the rotor and stator pole faces, of a predetermined desired width. As preferred, the stator is air-cooled through the provision of a perforated plate 36 forming a part of the housing section 11.

From the assembly as thus far described, it will be appreciated that some leakage of refrigerant fluid from the space 38 in the sealed compressor casing, may occur along the shaft 16 outwardly past the bearing 18 and simple running seal 19, to the interior of the motor housing, from which the leakage fluid may contact the motor windings 34 and thence pass to external atmosphere through the vent openings in plate 36, as well as through a large vent opening 39 in the top portion of housing section 11.

While a running seal more effective than the simple seal 19 shown, may be utilized, it is found that known shaft seals are not fully effective to preclude any leakage past the shaft. Therefore, it is a purpose of the present invention to provide a seal arrangement which does not require any provision attempting to effect a positive or absolute running seal at the shaft in its projection into the motor casing. According to the invention, the seal comprises a novel and effective wall or diaphragm disposed to afford a hermetic seal of the motor housing portion containing the motor 22.

Referring to the drawing, there is provided a flat, disc-like wall member 40 of an extent to span the motor housing with its peripheral margin 42 disposed between the opposed end margins of the housing sections 11 and 12 (Fig. 1). Wall 40 is formed of suitable rigid, non-magnetic material, preferably stainless steel, and is characterized by a thinness to enable the extension of the wall through the air gap afforded between the opposed pole faces of the rotor and stator assemblies. In the present example, the thinness of plate 40 is less than but closely approximating the width of the air gap. Plate 40 is suitably reinforced against lateral distortion and bending, by an annular plate element 43 secured as by spot-welding, to one side of the plate in its marginal portion, and a further annular plate element 44 which may be similarly secured directly upon plate element 43, as shown. The center portion or center area of plate 40 is similarly reinforced by a disc-plate element 46. Element 46 has secured thereto a bracket 47 supporting a stud 48 for plate support as will appear presently.

In assembly, the plate structure 40 as thus formed, is arranged as shown in Fig. 1, and is marginally secured to the motor housing by passage of the bolts 14 through suitable apertures 50 in the margin of the plate structure. Hermetic seal of the plate structure at the housing connection is here effected by a suitable sealing gasket 51 interposed between the plate 40 and the marginal portion of casing section 12. The plate is centrally supported through the stud 48 in connection to the stator frame member 30, effected as by the lock nuts 52. The connection of the stud 48 to frame member 30 is adjustable for facilitating accurate planar positionment of the plate assembly 40. It will appear now that the wall member 40 cooperates with the motor housing section 12 to define a rotor chamber hermetically sealed from the stator assembly 28 and its housing section 11. Thus, any fluid leakage past the shaft into the rotor chamber, will be confined to that chamber.

Since the seal plate 40 extends through the motor air gap, it is located in final assembly such that the plate may, or by preference will, seat against the stator pole faces 35, thereby facilitating an adequate running clearance with respect to the rotor pole faces, while affording a backing for the plate against bending displacement consequent to leakage fluid pressures which may obtain in the sealed rotor housing section.

It will appear further according to the arrangement shown, that access may be had to the rotor and its shaft mounting, as for repair or replacement, merely by removing the bolts 14, allowing ready disassembly of both the housing section 11 containing the stator structure, and the sealing wall structure 40.

Having now described the invention in connection with a presently preferred embodiment thereof, it will be understood that changes may be made in the construction and arrangement of parts without departing from the spirit and scope of the invention as claimed.

I claim:

1. The combination with an electric machine including a housing, a magnetic stator assembly therein providing pole faces in a plane perpendicular to the axis of the machine, and a magnetic rotor in the housing having pole faces in a plane parallel to the plane of the stator pole faces, of means dividing the interior of the housing, comprising a thin disc-like wall member of non-magnetic material, marginally secured to the housing and extending between the rotor and stator pole faces, and a support for the central area of the wall member, adjustably connected to the stator assembly.

2. The combination with an electric machine of axial air gap type, including a magnetic stator assembly providing pole faces in a plane perpendicular to the machine axis, a magnetic rotor providing pole faces in a plane parallel to the plane of the stator pole faces, the stator and rotor pole faces being spaced apart to define an axial air gap of predetermined width, and a housing enclosing the stator and rotor, of means forming with the housing separate chambers for the stator and rotor, comprising a disc-like wall member of non-magnetic material, marginally secured to the housing and extending through said air gap, said wall member at least in the portion thereof extending through the air gap, being of a thickness less than but closely approximating the air gap width, and adjustable means supporting the central area of the wall member relative to the stator assembly.

3. The subject matter of claim 2 wherein said disc-like wall member is formed to include means reinforcing the member against lateral distortion and bending.

4. A wall member provided as a unitary structure for the purpose described, comprising a thin disc-like plate of non-magnetic material, a reinforcing element extending along the plate margin at one side of the plate and secured thereto, a second reinforcing element of disc-like form, secured to one side of the plate over the central zone thereof, a bracket on the plate, and a plate-mounting element on said bracket.

5. In apparatus of the character described, including a casing wall normally subjected on one side to fluid pressure, said wall having an opening therethrough, a shaft journalled in said opening and having one end projecting outwardly from the opposite side of the casing wall, a housing extending from said opposite side of the casing wall, an axial air gap type electric motor in said housing, comprising a magnetic stator assembly providing planar pole faces, and a magnetic rotor mounted on the projecting end of said shaft, said rotor providing planar pole faces in spaced opposition to the stator pole faces, the combination therewith of means for confining fluid attaining the opposite side of the casing wall through leakage along the shaft, to that portion of said housing containing said magnetic rotor, said means comprising a thin planar wall member of non-magnetic stainless steel, marginally secured to the housing and extending through the housing between the rotor and stator pole faces, said wall member thereby cooperating with the housing to form separate rotor and stator chambers, and a support for the central portion of said wall member, adjustably connected to said stator assembly.

6. In apparatus of the character described, including a casing wall normally subjected on one side to fluid pressure, said wall having an opening therethrough, a shaft journalled in said opening and having one end projecting outwardly from the opposite side of the casing wall, a housing extending from said opposite side of the casing wall, an axial air gap type electric motor in said housing, comprising a magnetic stator assembly providing planar pole faces, and a magnetic rotor mounted on the projecting end of said shaft, said rotor providing planar pole faces in spaced opposition to the stator pole faces, the combination therewith of means for confining fluid attaining the opposite side of the casing wall through leakage along the shaft, to that portion of said housing containing said magnetic rotor, said means comprising a thin planar wall member of non-magnetic stainless steel, marginally secured to the housing and extending through the housing between the rotor and stator pole faces, said wall member thereby cooperating with the housing to form separate rotor and stator chambers, means on the wall member reinforcing the member against lateral distortion and bending, and a support for the central portion of said wall member, adjustably connected to said stator assembly.

GORDON R. ANDERSON.

REFERENCES CITED

The following references are of record in the file of this patent:

UNITED STATES PATENTS

| Number | Name | Date |
| --- | --- | --- |
| 50,107 | Evans | Sept. 26, 1865 |
| 592,244 | Fay | Oct. 26, 1897 |
| 593,571 | Fay | Nov. 16, 1897 |
| 1,233,569 | Graemiger | July 17, 1917 |
| 2,275,712 | Zand | Mar. 10, 1942 |
| 2,295,404 | Johns | Sept. 8, 1942 |
| 2,335,276 | Heintz | Nov. 30, 1943 |
| 2,444,687 | Widakowich | July 6, 1948 |